May 3, 1938.     O. R. HARTZELL     2,115,718
DISPLAY BOARD
Filed May 13, 1935     2 Sheets-Sheet 1

INVENTOR.
OLIVER R. HARTZELL
BY George B. White
ATTORNEY.

May 3, 1938.　　　　　O. R. HARTZELL　　　　　2,115,718
DISPLAY BOARD
Filed May 13, 1935　　　　　2 Sheets-Sheet 2
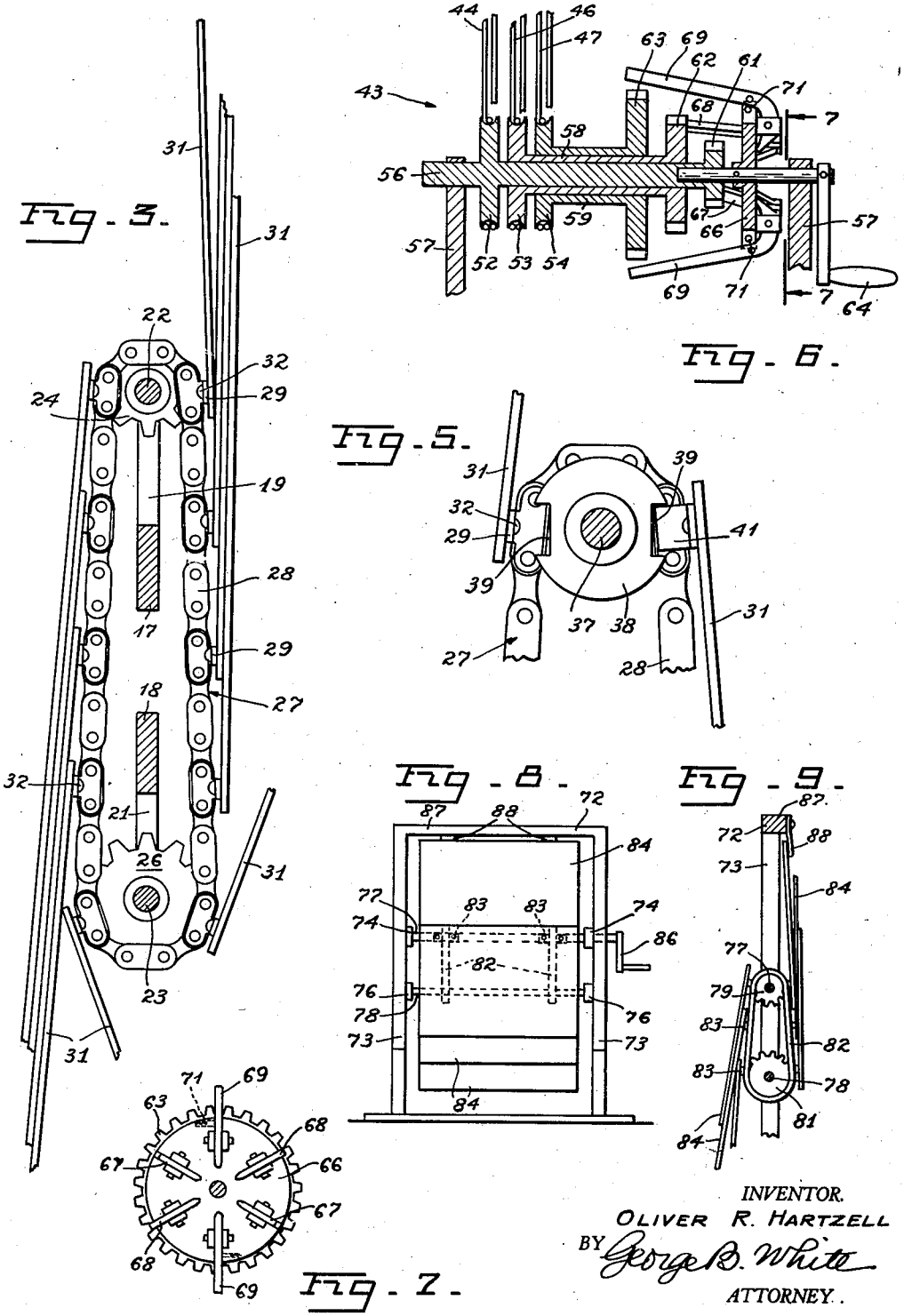
INVENTOR.
OLIVER R. HARTZELL
BY George B. White
ATTORNEY.

Patented May 3, 1938

2,115,718

UNITED STATES PATENT OFFICE 2,115,718

DISPLAY BOARD

Oliver R. Hartzell, San Rafael, Calif.

Application May 13, 1935, Serial No. 21,083

17 Claims. (Cl. 40—97)

This invention relates to display devices and indicators.

An object of the invention is to provide a device wherein a plurality of displays or indicators can be brought into view successively by the intermittent operation of endless members, the displays or indicators being arranged in continuous overlapping relation to each other in a comparatively short and compact unit and are so related to the endless members that the back face of a preceding display or indicator and the front face of the next successive display or indicator are exposed to view at the same time.

Another object of the invention is to provide a device wherein a plurality of series of displays or indicators, for instance of the type shown in my copending application Serial No. 756,857, filed December 10, 1934, can be selectively actuated to bring into view selected combinations of displays or indicators; means being provided to co-ordinate the operation of at least two adjacent series of displays or indicators, and to selectively operate all of said series, and also to accomplish a compact unit with a comparatively large number of combinations of displays or indicators.

Another object of this invention is to provide display devices and indicators which are highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

The invention is clearly illustrated in the accompanying drawings, wherein

Figure 3 is a fragmental, sectional view of an indicator unit of my device.

Figure 5 is a fragmental sectional view of the device showing the intermittent moving connection between the shafts of a double unit of my device, the section being taken on the line 5—5 of Figure 4.

Figure 6 is a sectional view of the selective actuating mechanism for my device.

Figure 7 is a sectional front view of the selective actuating mechanism, the section being taken on the line 7—7 of Figure 6.

Figure 8 is a front view of a modified embodiment of my device, and

Figure 9 is a sectional view of said modified embodiment.

Figure 1:
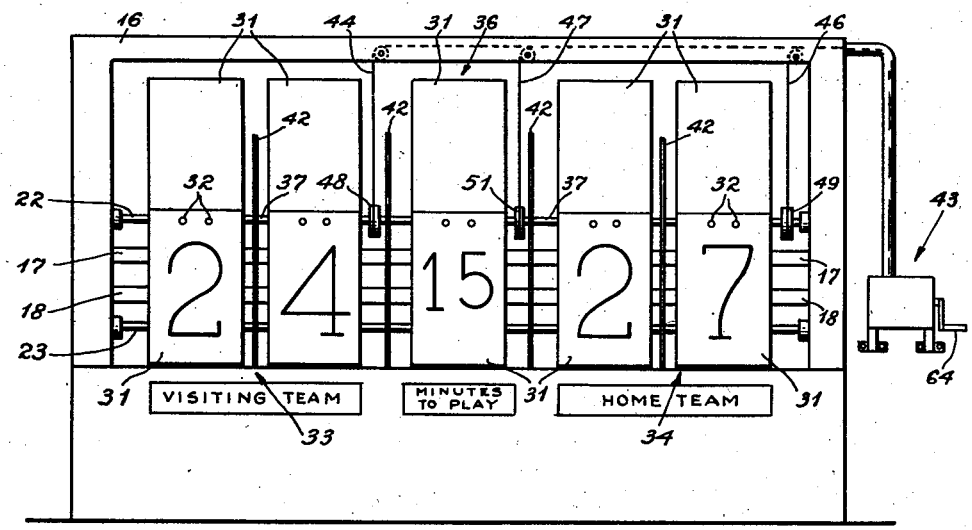
Figure 1 is a front view of my device.
Figures 2, 4:
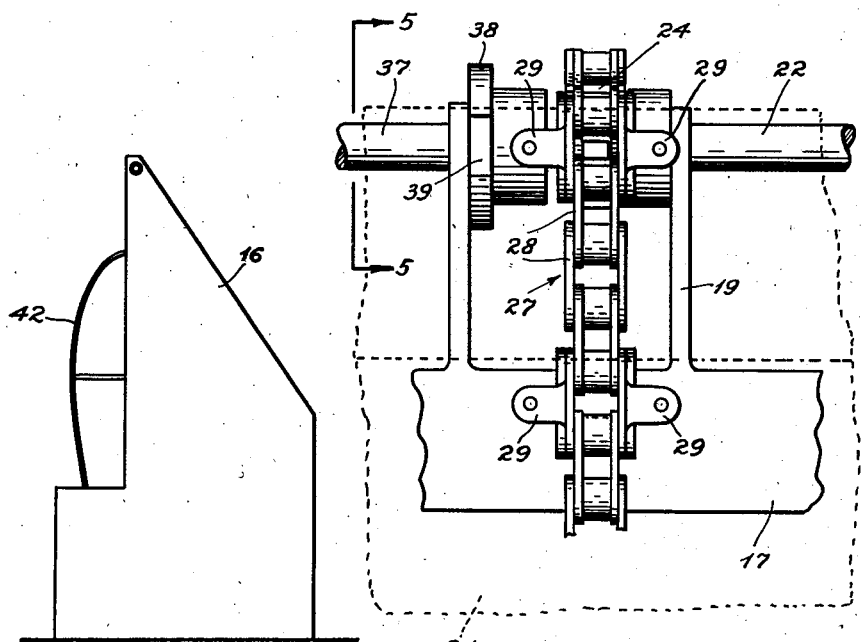
Figure 2 is a side view of my device.
Figure 4 is a fragmental, front view of the shaft connections of a double unit of my device.

In carrying out my invention I make use of a frame 16 adapted to be either set on a base or mounted on a wall. On cross members 17 and 18 of the frame 16 are a series of bearing brackets 19 and 21 in which are journaled drive shafts 22 and idler shafts 23 respectively. Drive shafts 22 and idler shafts 23 are in vertical alignment and carry aligned sprockets 24 and 26 thereon. The upper sprocket 24 is a drive sprocket and is of smaller diameter than the lower, idler sprockets 26, the ratio being about one to two or more. Around each pair of sprockets 24 and 26 is played an endless member, preferably a narrow chain conveyor 27, which is made up of usual links 28. Due to the dimensions of the sprockets 24 and 26 the chain conveyor 27 tapers upwardly, in other words the rear and front sides of the conveyor converge upwardly.

Preferably on each fourth link 28 are formed outwardly extended flat ears 29 on each pair of which is secured a panel 31 preferably made of cardboard or wood, but if necessary it may be made of composition board or metal. Each panel 31 is held in place by bolts or screws 32 near the leading edges thereof with respect to the normal movement of the conveyor. The panels 31 are much wider than the width of the chain conveyor 27 and are of such length that each panel 31 is capable of overlapping and covering about the entire length of the conveyor 27, so that the uppermost panel 31 in the front covers and renders invisible all the succeeding panels 31 on the same side of the conveyor 27.

The upper, or drive sprocket 24 is of such diameter that it provides a quick turn, and accommodates substantially three links 28 on its top and one link 28 on each side. Consequently a panel 31 is fully visible at the front of the sprocket 24, and the next preceding panel 31 is visible in inverted position at the rear of the sprocket 24.

In connection with a scoreboard to be used as score indicator at games, such as basket ball games, there are used two double units 33 and 34 and single unit 36 between said double units. Each double unit includes two series of panels 31, and each series includes ten panels 31 bearing numerals successively from "0" or blank to "9". The single unit 36 has a series of panels marked to correspond to the number of minutes played in a period of the game. The frame 16 has a box or board around it which is marked under the double unit 33 "Visiting Team", under the double unit 34 "Home Team", and under the intermediate single unit 36 "Minutes to Play", thus affording means to indicate all the necessary phases of the game.

The single unit 36 is constructed in accordance with the indicator heretofore described. Each double unit 33 or 34 includes two parallel spaced indicators of the aforedescribed construction but the driving shaft 37 of each indicator nearest to the central unit 36 terminates in a cam disc 38, which latter has indentations or notches 39 spaced 180° apart on the disc periphery. The panel 31 bearing the numeral 9 has a lug 41 extended from its rear face adjacent its secured end and to one side from the conveyor 27 so arranged that the lug 41 engages one of the notches 39 and remains engaged with the latter until after the said panel 31 is turned 180° from the front to the rear of the conveyor 27, thereby rotating the disc 38 and the shaft 37 a half of a turn every time the numeral "9" is turned out of view and the succeeding numeral "0" is brought into view at the top of the front of the conveyor 27. In this manner the decimal digits carried by the panels 31 on the conveyor 27 played around the shaft 37 are moved once after all the ten unit digits on the adjacent conveyor 27 were successively brought into view once.

In order to prevent the plates 31 of adjacent series interfering with each other by reason of a slight wobble or the like a fixed guide ring 42 is secured on the cross members 17 and 18 of the frame 16. The circumference of this ring 42 substantially corresponds to the positions of the adjacent edges of the panels 31 near their respective free ends as the panels 31 are turned around the upper and lower sprockets 24 and 26. It is to be noted that in this illustration the uppermost panel 31 of a series covers at least four overlapping, succeeding panels 31, rendering the device short and compact. This overlapping action is facilitated by the incline of the conveyor 27 toward its upper narrow turn.

To each drive shaft 22 is connected a selective actuating mechanism 43 whereby either one or more sets of conveyors may be selectively turned to achieve any desired combination of displays. This mechanism 43 includes, for instance, endless cords 44, 46, 47, played around suitable pulleys 48, 49, and 51 respectively on the drive shafts 22 of the double units 33 and 34, and of the single unit 36. The cords 44, 46, and 47 also engage sheaves 52, 53, and 54 respectively. The sheave 52 is fixed on a shaft 56 journaled in a support 57 remote from the device, and preferably located at the stand of an official of the game. The sheave 53 is secured on a hollow shaft 58 which is rotatable on the shaft 56, and the sheave 54 is secured on a second hollow shaft 59 rotatable on the exterior of the first hollow shaft 58. The three shafts 56, 58, and 59 are rotatable independently of each other and are graduated in length, the outermost shaft 59 being the shortest so that the inner shafts extend beyond the respective outer shafts at both ends. On the other ends of the shafts 56, 58, 59 are fixed suitable gears 61, 62, and 63 respectively, which are also of gradually decreasing diameter. The gear 63 on the outermost shaft 59 is the largest. In the end of the shaft 56 and on the support 57 is journaled an actuating crank shaft 64 which has an actuating disc 66 fixed thereon. On the actuating disc 66 are swingable connecting arms 67, 68, and 69 pivoted at circumferentially spaced points of the disc 66. The arm 67 is the shortest and it is so bent that, when swung inwardly it engages the gear 61. The arms 68 and 69 respectively fit the other gears 62 and 63. A spring pressed catch 71 in the disc 66 adjacent each arm 67, 68, and 69 is urged into engagement with the respective arms to hold the latter in engaged or disengaged positions.

By this actuating mechanism 43 either one or all of the units 33, 34, or 36 may be moved into a selected combination of displays. When the longest arm 69 is in operative position then the rotation of the disc 66 by means of the crank shaft 64 causes the rotation of the shaft 59 and of the sheave 54, which in turn through the cord 47 and the pulley 51 moves the intermediate single unit 36. The arm 68, when connected to the gear 62 actuates the double unit 34 through the shaft 58, the sheave 53, the cord 46 and the pulley 49. The arm 67, when connected to the gear 61, actuates the double unit 33 through the shaft 56, the sheave 52, the cord 44 and pulley 48. One or more of said arms 67, 68, and 69 may be swung in operative position. Thus by means of turning the crank shaft 64 any combination of displays can be accomplished that was preselected by the operation of said actuating arms.

The device heretofore described is primarily adapted for use as a scoreboard, however the same principle of operation may be embodied in devices to display selected varying combinations of advertising matter, or announcers, targets, and the like.

For instance the embodiment shown in Figures 8 and 9 is an adaptation of my device as a song leader, or black board or the like uses. In this embodiment a frame 72 is provided with standards 73. Each standard has a pair of aligned journals 74 and 76 thereon. A drive shaft 77 is held in the upper journals 74, and an idler shaft 78 is held in the lower journals 76. A sprocket 79 is fixed near each end of the drive shaft 77, and a larger idler sprocket 81 is fixed near each end of the shaft 78 in alignment with the respective upper sprockets 79. An endless chain conveyor 82 extends around each pair of sprockets 79 and 81 so that the branches of said conveyor 82 converge upwardly. On each chain conveyor 82 there are equally spaced flat flanges 83 so arranged that the respective flanges 83 of the conveyors 82 are in horizontal alignment. A comparatively large panel or board 84 is secured over each pair of horizontally aligned flanges 83 near the upper ends of the respective panels 84. Each panel 84 extends over both conveyors 82 and is of sufficient length to overlap practically all the successive panels 84 of the series.

The lines of songs in series, or maps, or illustrations for school instruction may be tacked or otherwise temporarily fixed on said panels 84 and the series of panels 84 may be moved intermittently by the manipulation of a crank 86 connected to the drive shaft 77, or by other suitable means. The panels 84 may be made of the usual material as black boards and the lines of songs may be written on them with the usual chalk. The revolving black boards may be used also in schools so that a teacher can write a lesson on it and it can be preserved for another class by turning a clean blackboard in its place when classes change. In order to facilitate writing also on the back of the panels 84 as a black board, on an inverted position, a resilient stop 85 is mounted on a top cross member 87 of the frame 72 by means of a pin or screw 88. The stop 86 yields slightly to allow the lowering of the board or panel 84 when the device is revolved for changing displays, but it bears against the uppermost rear panel 84 to hold the latter and allow writing on its back side. There are always two boards 84 in view namely the topmost front board, and the backsides of the topmost rear board. In order to allow flat shipping the flanges 83 of two adjacent boards or panels 84 are spaced from each other at a distance substantially equal to half of the circumference of the lower, larger sprocket 81, the other flanges 83 are spaced on the conveyor 82 at a distance substantially equal to half of the circumference of the upper, smaller sprocket 79. Before transporting the conveyors 82 are turned to a position where said more widely spaced boards 84 are located on the opposite sides of the lower sprocket 81 and then there is no laterally extended board or panel at the bottom portion of the sprocket 81, hence the display board is rendered flat and readily portable.

Having thus described my invention what I claim and desire to secure by Letters Patent is:

1. In a display device of the character described, a frame, a plurality of conveyors on said frame arranged in parallel spaced relation, a series of separate panels connected to each conveyor each bearing a display, and a driving mechanism connected to said conveyor to selectively move said conveyors separately or together.

2. In a score board, a frame, a plurality of conveyors supported in spaced relation on the frame so that the front side of each conveyor is exposed to view at the front of the frame, a series of panels carried by each conveyor, each panel having a numeral thereon for the indication of a phase of a game, transmission means for each conveyor, means to impart movement to said transmission means and said conveyors, and means to selectively connect said moving means to said transmission means.

3. In a score board, a frame, a plurality of conveyors supported in spaced relation on the frame so that the front side of each conveyor is exposed to view at the front of the frame, a series of panels carried by each conveyor, each panel having a numeral thereon for the indication of a phase of a game, transmission means for each conveyor, a rotatable member connected to each transmission means so as to impart movement to said transmission means and said conveyors, an actuating element, and means to selectively connect said actuating element to said rotatable members.

4. In a scoreboard of the character described, the combination with a plurality of conveyors on a frame, each conveyor carrying a series of panels with score indicating numerals thereon, of a selective driving mechanism for said conveyors comprising transmission means connected to each of said conveyors, a rotary member connected to each of said transmission means, a driven element connected to each rotary member, a common driving element for all driven elements, and selective means to operatively connect the selected driven elements to said driving element at will.

5. In a display device of the character described the combination with a plurality of endless carriers each carrying a series of panels with displays thereon, and means to move said endless carriers on rotatable drive members, said panels being hung on the carriers by their upper ends and overlap each other, of a stationary panel guide comprising a fixed rigid member on the frame adjacent to each side of each conveyor and adjacent to the location of the edges of the panels at the turning points of said panels on said carriers.

6. In a display device of the character described, a frame, a plurality of conveyors on said frame arranged in parallel spaced relation, a series of panels on each conveyor each bearing a display, and a driving mechanism adapted to selectively move said conveyors separately or together, said driving mechanism including transmission means to each conveyor, a rotatable member connected to each transmission means so as to impart movement to said transmission means, an actuating element, and means to selectively connect said actuating element to said rotatable members.

7. In a display device the combination with a pair of endless carriers arranged side by side on a frame, each carrier passing around a driving, rotating member at one end, and an idle member at the other end thereof, and a series of panels secured near their upper ends to each carrier to be carried around by said endless carriers, each driving rotating member being on a separate shaft journalled on the frame, of driving means connected to the drive shaft of one of said driving, rotary members, an actuated element on the driving shaft of the other driving, rotary member, and actuating means at one of said panels on the carrier driven by said first driving, rotary member to engage and turn said actuating element and said second driving shaft every time said actuating means passes said actuated element.

8. In a display device the combination with a pair of endless carriers arranged side by side on a frame, each carrier passing around a driving, rotating member at one end, and an idle member at the other end thereof, and a series of panels secured near their upper ends to each carrier to be carried around by said endless carriers, each driving, rotating member being on a separate shaft journalled on the frame, of driving means connected to the drive shaft, a cam on the driving shaft of the other driving, rotary member, and actuating means at one of said panels on the carrier driven by said first driving, rotary member to engage and turn said actuating element and said second driving shaft every time said actuating means passes said actuated element.

9. In a display device of the character described, a frame, an endless conveyor on the frame, a series of panels secured on the conveyor in longitudinally overlapping position, the upper turn of the conveyor being of smaller diameter than its lower turn and said panels being so spaced that the uppermost panel in the front of said upper turn and the uppermost panel in the rear of said upper turn are simultaneously visible, one pair of adjacent panels being longitudinally spaced from each other on said conveyor to a distance substantially equal one half of the circumference of the lower turn of the conveyor to hold all panels parallel when said pair of panels are located at said lower turn.

10. In a display device of the character described, a frame, an endless chain conveyor, a drive shaft journalled on the frame, a drive sprocket on the drive shaft at the upper turn of the conveyor, an idler sprocket journalled on the frame at the lower turn of the conveyor, a series of panels, secured on spaced links of said conveyor so as to lie substantially parallel with the conveyor and longitudinally overlap each other said panels having displays on both faces thereof, the upper sprocket being of smaller diameter than the lower sprocket so that the sides of the conveyor converge upwardly, and the panels are being so spaced that the panel at the front of the upper turn of the conveyor, and another panel at the rear of said upper turn are visible simultaneously, the panels being of such length relatively to the length of said conveyor that the uppermost front panel in front overlaps substantially all the other panels.

11. In a display device of the character described, a pair of endless carriers, drive elements for each carrier around which the respective carriers are trained, each of said carriers having its branches converging upwardly, a series of longitudinally overlapping panels fixed on each carrier and bearing displays, means to transmit movement to one of said carriers, and coacting means on one of said panels on said movable carrier to impart intermittent movement to the other carrier.

12. In a display device of the character described, a frame, a chain conveyor, a drive sprocket at one turn of the conveyor journalled on the frame, an idler sprocket at the other turn of the conveyor, a series of panels fixed near their leading edges to spaced links of said chain conveyor so that a leading panel overlaps a plurality of the successive panels on each side of the conveyor, the chain conveyor extending substantially along the longitudinal center lines of the series of panels, the drive sprocket being of a diameter to accommodate two adjacent panels of the series at an angle of substantially 180 degrees relatively to each other on the opposite sides of the upper turn of the conveyor, and means to impart intermittent rotary movement to said drive sprocket.

13. In a display device of the character described the combination with an endless carrier on a frame and a series of overlapping boards secured to the carrier adjacent their respective upper ends in their front position, said carrier and said boards being so related that the reverse side of a panel is visible simultaneously with the front side of the next succeeding panel, of a releasable stop on the frame adapted to engage a board in its reversed visible position to prevent its backward swinging under pressure on its visible side.

14. In a display device of the character described a frame, a pair of parallel transverse shafts on the frame, a pair of aligned sprockets near each end of said shafts, an endless member trained around each pair of aligned sprockets, a plurality of overlapping boards on said endless member, each board overlapping both endless members and being fixedly secured thereto, and means whereby said endless members may be turned to carry said boards around.

15. In a display device of the character described a frame, a pair of parallel transverse shafts on the frame, a pair of aligned sprockets near each end of said shafts, an endless member trained around each pair of aligned sprockets, a plurality of overlapping boards on said endless member, each board overlapping both endless members and being fixedly secured thereto, and means whereby said endless members may be turned to carry said boards around, and means to hold the rear uppermost board against tilting pressure exerted on its exposed face.

16. In an indicator device, a frame, a plurality of conveyors supported in spaced relation on the frame so that the front side of each conveyor is exposed to view at the front of the frame, a series of panels carried by each conveyor, each panel having markings thereon arranged in series relatively to the markings of the other adjacent panels, transmission means for each conveyor, means to impart movement to said transmission means and said conveyors, and means to selectively connect said moving means to said transmission means.

17. In a display device of the character described, a plurality of endless carriers, drive elements for each carrier around which the respective carriers are trained, a series of longitudinally overlapping panels fixed on each carrier and bearing displays, means to transmit movement to one of said carriers, and coacting means on one of said panels on said movable carrier to impart intermittent movement to the other carrier.

OLIVER R. HARTZELL.